United States Patent
Iliev et al.

(10) Patent No.: US 9,602,521 B2
(45) Date of Patent: *Mar. 21, 2017

(54) SECURING CLOUD COMPUTING ENVIRONMENTS

(71) Applicant: SAP SE, Walldorf (DE)

(72) Inventors: Hristo Iliev, Sofia (BG); Stoyan Boshev, Sofia (BG)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,427

(22) Filed: Jun. 17, 2016

(65) Prior Publication Data

US 2016/0294850 A1 Oct. 6, 2016

Related U.S. Application Data

(63) Continuation of application No. 14/301,575, filed on Jun. 11, 2014, now Pat. No. 9,432,398.

(51) Int. Cl.
*H04L 29/06* (2006.01)
*G06F 17/30* (2006.01)
*G06F 21/62* (2013.01)

(52) U.S. Cl.
CPC .... *H04L 63/1408* (2013.01); *G06F 17/30312* (2013.01); *G06F 21/62* (2013.01); *H04L 63/14* (2013.01); *H04L 63/1433* (2013.01); *H04L 63/1458* (2013.01)

(58) Field of Classification Search
CPC ............ H04L 63/1458; H04L 63/1408; H04L 63/1416; H04L 63/1441; G06F 17/30312; G06F 21/552

USPC .......................................................... 726/23
See application file for complete search history.

(56) References Cited

U.S. PATENT DOCUMENTS

| | | | |
|---|---|---|---|
| 7,653,828 B2 | 1/2010 | Kostadinov et al. | |
| 7,689,600 B2 | 3/2010 | Semerdzhiev et al. | |
| 8,201,189 B2 | 6/2012 | Semerdzhiev et al. | |
| 9,432,398 B2 * | 8/2016 | Iliev ..................... | H04L 63/1458 |
| 2014/0007239 A1 * | 1/2014 | Sharpe ................. | G06F 21/561 |
| | | | 726/24 |

* cited by examiner

*Primary Examiner* — Baotran N To
(74) *Attorney, Agent, or Firm* — Fish & Richardson P.C.

(57) ABSTRACT

Some examples of security cloud computing environments can be implemented as methods. A processor of a first computer system that lacks permission to store data in a cloud computing environment receives data to be stored in the cloud computing environment. The data is received from a second computer system implementing the cloud computing environment and having permissions to store data in the cloud computing environment. The processor of the first computer system determines that the received data is safe for storage in the cloud computing environment. The processor of the first computer system determines that the received data is safe for storage in the cloud computing environment. The processor of the first computer system provides a notification to the second computer system indicating that the received data is safe for storage in the cloud computing environment, and an identifier that points to the stored data at the computer-readable storage medium.

20 Claims, 6 Drawing Sheets

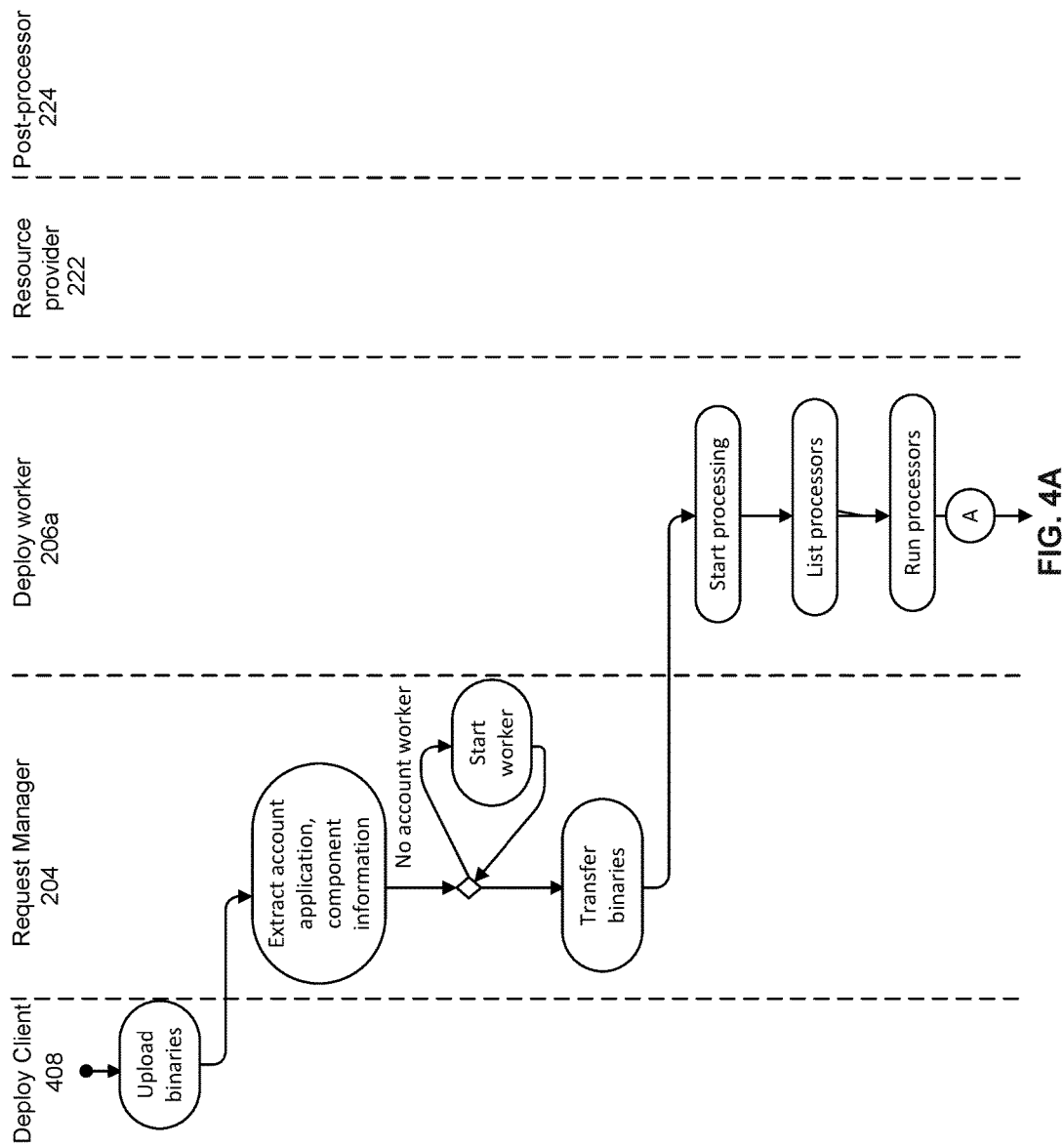

SECURING CLOUD COMPUTING ENVIRONMENTS

CLAIM OF PRIORITY

This application claims priority under 35 USC §120 to U.S. patent application Ser. No. 14/301,575, (now U.S. Pat. No. 9,432,398), filed on Jun. 11, 2014, the entire contents of which are hereby incorporated by reference.

TECHNICAL FIELD

This disclosure relates to cloud computing environments.

BACKGROUND

Cloud computing involves executing processes, e.g., simultaneously, on multiple computers that are connected in a network. A user who has permission to access the cloud computing environment can use the processing power of the multiple computers to perform computing tasks, e.g., execute a computer application, store data or perform other computing tasks. The computers operating in the cloud computing environment execute software in response to user input. Some input can be malicious and designed to cripple the cloud environment through a Denial-of-Service attack (DoS attack) or a distributed denial-of-service attack (DDoS attack).

SUMMARY

This disclosure describes securing cloud computing environments.

Certain aspects of the subject matter described here can be implemented by as a method. A processor of a first computer system that lacks permission to store data in a cloud computing environment receives data to be stored in the cloud computing environment. The data is received from a second computer system implementing the cloud computing environment and having permissions to store data in the cloud computing environment. The processor of the first computer system determines that the received data is safe for storage in the cloud computing environment. The processor of the first computer system determines that the received data is safe for storage in the cloud computing environment. The processor of the first computer system provides a notification to the second computer system indicating that the received data is safe for storage in the cloud computing environment, and an identifier that points to the stored data at the computer-readable storage medium.

This, and other aspects, can include one or more of the following features. The first computer system can generate the identifier that points to the stored data at the computer-readable storage medium. With or without the preceding feature, the first computer system can process the received data to extract at least one of security information, documentation, or metadata included in the received data, and provide the extracted at least one of the security information, the documentation, or the metadata to the second computer system. The extracted at least one of the security information, the documentation, or the metadata can be stored in the computer-readable storage medium. The second computer system can permanently store the extracted at least one of the security information, the documentation or the metadata. With or without any of the preceding aspects, processing the received data to extract the at least one of the security information, documentation, or the metadata included in the received data can include determining that an additional resource is required to extract the at least one of the security information, documentation, or metadata, and transmitting a request for the additional resource to the second computer system. The second computer system can receive the request for the additional resource, and, in response, retrieve and provide the additional resource to the first computer system. With or without any of the preceding features, a processor of the second computer system can receive a request to store the data in the cloud computing environment. The processor of the second computer system can generate an identifier to identify the data, and provide the data to be stored in the cloud computing environment to the first computer system. In response to receiving the notification and the identifier from the first computer system, the second computer system can retrieve the stored data from the computer-readable storage medium, and store the retrieved data at the one or more computer-readable storage media connected to the cloud computing environment. The data received from the second computer system can be first data. The notification can be a first notification. With or without any of the preceding features, the first computer system can receive second data from the second computer system. The second data can be unsafe for storing or execution in the cloud computing environment. The first computer system can fail to process the second data. The second computer system can determine that the first computer system has failed to process the second data. The second computer system can identify the second data as being unsafe for storing or execution in the cloud computing environment. In any of the preceding aspects, the data can include binaries received from a user to be stored or executed in the cloud computing environment.

Certain aspects of the subject matter described here can be implemented as a computer-readable medium storing instructions executable by one or more processors to perform operations described here. Certain aspects of the subject matter described here can be implemented as a system including one or more processors and a computer-readable medium storing instructions executable by the one or more processors to perform operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

FIGS. 4A, 4B, and 4C show a line diagram showing example operations performed by different entities in the cloud computing environment.

DETAILED DESCRIPTION

Figure 1:
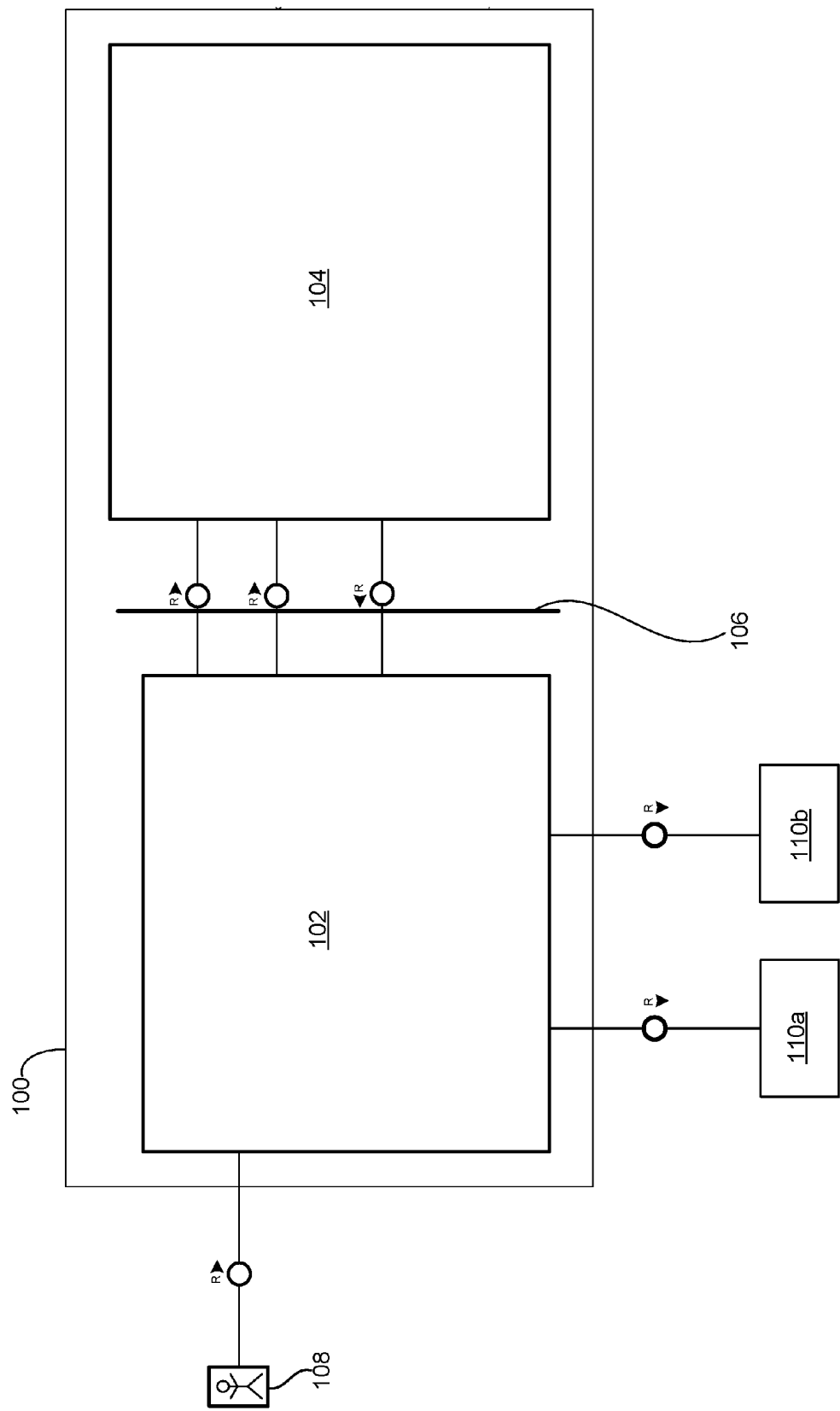
FIG. 1 is a schematic diagram of a cloud computing environment separated by a computer-implemented trust boundary.

This disclosure relates to securing cloud computing environments. Cloud computing environments include multiple networked computers executing computer instructions, e.g., computer software applications. Often, the cloud computing environment receives input, e.g., data such as binaries, from the users to perform operations, e.g., execute software, store data, or other operations. In some instances, the input can be used to initiate a DoS attack or a DDoS attack to cripple the cloud computing environment and make the services offered by the cloud computing environment unavailable to other users. In one example of a DoS attack, a large amount of data including special characters or ranges is sent in an input format, e.g., ZIP bomb, XML format, or other input format. All or a significant portion of the cloud computing environment's resources are allocated to processing the large amount of data rendering the cloud computing environment unavailable to respond to legitimate input from other users. Sometimes, malicious input can be used to steal data associated with other users who have stored data in the cloud computing environment. One technique to protect against such DoS attacks and/or attempts to steal other users' data is to place input validation checks that verify that input data is not malicious. However, some DoS attacks are launched during the validation check leaving such checks vulnerable.

This disclosure describes defining a trust boundary in the cloud computing environment that separates the environment into a portion that evaluates data received through input from users and a portion that performs operations (e.g., execution, storage or other operations) on the received data. The portion of the cloud computing environment that evaluates the received data can be considered an untrusted portion because the received data has not yet been evaluated as being safe for the cloud computing environment. For example, the untrusted portion can receive data, unpack the received data, and read the data to identify the data components, e.g., the XML or JSON files. Additionally, an attacker can bypass security measures and can execute untrusted/unchecked code in this portion of the cloud computing environment.

The portion of the cloud computing environment that performs operations on the received data can be considered as a trusted portion because the data on which the operations are performed have been evaluated as being safe for the cloud computing environment. For example, the trusted portion can include credentials and permissions to store the data in the cloud computing environment. The trust boundary and process isolation in between can ensure that even if the data received by the untrusted portion is unsafe and/or malicious, the trusted portion remains unaffected and continues to operate. In addition, security sensitive data stored by the trusted portion (e.g., user/password pairs, certificates, configurations, or other security sensitive data) can be protected from malicious data received by the untrusted portion. In this manner, the trust boundary is defined to ensure that any impact of processing malicious data on the untrusted portion does not cross-over to the trusted portion.

Implementing the techniques described here can provide protection against input data attacks, e.g., attacks launched during validation checks. The techniques can be implemented to protect one or more processes being executed in the cloud computing environment from malicious data without knowing, in detail, the attack vector or without performing detailed or costly input validation. The trust boundary can be implemented to allow or deny a code to execute and to provide isolation between the trusted and untrusted portions of the cloud computing environment. Implementations of the trust boundary can minimize impact on the trusted portion of the cloud computing environment even if an attacker succeeded in attacking the untrusted portion because the trusted boundary will protect execution of the trusted portion and the data despite the successful attack. Implementations can also prevent attackers' attempts to steal data from other users. In this manner, even if an attacker managed to bypass the security measures implemented on the untrusted portion and runs untrusted code, the trusted portion would remain unaffected and data stored on the trusted portion cannot be accessed. As described below, the process isolation can be realized with several technologies (individually or in any combination), e.g., file permissions, remote access (HTTP/ResT) to isolation done by virtualizing the untrusted portion.

FIG. 1 is a schematic diagram of a cloud computing environment 100 separated by a computer-implemented trust boundary 106. The cloud computing environment 100 can include multiple networked computers, each executing computer instructions, e.g., simultaneously, sequentially, or otherwise. Each computer in the cloud computing environment 100 can include a respective computer-readable medium and can store computer instructions executable by the computer-readable medium to perform operations. For example, the computer instructions stored on the computer-readable medium of a computer can represent all or portions of one or more processes that the cloud computing environment 100 can implement. As described above, the trust boundary 106 separates the cloud computing environment 100 into a trusted portion and an untrusted portion. In the example implementation described with reference to FIG. 1, each of the trusted portion and the untrusted portion is described as including one computer system. In some implementations, each of the trusted portion and the untrusted portion can include multiple networked computer systems that implement operations of the respective portion and that collectively form the cloud computing environment 100.

The trusted portion of the cloud computing environment 100 can include and implement a first computer system 102, which can include a computer-readable medium storing instructions executable by data processing apparatus (e.g., one or more processors) to perform operations. The operations can include trusted operations, e.g., storing data such as user/password pairs, certificates, configurations and other data, executing processes in the cloud computing environment 100, and other trusted operations. A trusted operation can be an operation that is implemented by the first computer system 102 using and/or on data that has been determined to be safe for the cloud computing environment 100. Data can be considered safe if executing the data will not result in the cloud computing environment 100 being crippled and/or rendered substantially unavailable for a majority of users who access the cloud computing environment 100. Data can also be considered safe if executing the data will not result in data associated with other users being copied, transferred or deleted from the cloud computing environment 100 to the detriment of the other users or without the other users' explicit permissions.

The trusted portion of the cloud computing environment 100 can further include one or more computer-readable storage media (e.g., a first computer-readable storage medium, a second computer-readable storage medium 110*b*, or other storage media) that can store data associated with the cloud computing environment 100. For example, the storage media can store data that has been determined to be safe for the trusted portion including data received through user input for storage and/or execution. Each of the networked computers in the trusted portion of the cloud computing environment 100 can access the data stored in the storage media to perform cloud computing operations. As described below, computer systems in the trusted portion have permission to store data in the computer-readable storage media included in the trusted portion, whereas computer systems in the untrusted portion do not have such permissions.

The untrusted portion of the cloud computing environment 100 can include and implement a second computer system 104, which can include a computer-readable medium storing instructions executable by data processing apparatus (e.g., one or more processors) to perform operations. The operations can include untrusted operations, e.g., receiving data from users, validating the data, and other untrusted operations. An untrusted operation can be an operation that is implemented by the second computer system 104 using and/or on data that has not yet been determined to be safe for the cloud computing environment 100. As described below, the second computer system 104 can evaluate whether or not the data is safe. When the second computer system 104 determines that received data is safe, i.e., the received data will not cause harm when executed in the cloud computing environment 100, an operation performed using the data can become a trusted operation.

Either the first computer system 102 or the second computer system 104 can implement a trusted operation, e.g., perform operations on data determined as being safe for the cloud computing environment 100. However, only the second computer system 104, i.e., the computer system included in the untrusted portion of the cloud computing environment 100, can implement an untrusted operation, e.g., perform operations on data that has not yet been determined as being safe for the cloud computing environment 100. Further, not all results of executing an untrusted operation may be transmitted to the trusted portion. For example, if the second computer system 104 determines that received data is safe for the cloud computing environment 100, then the second computer system 104 can transmit a result of the determination to the first computer system 102. On the other hand, if the second computer system 104 determines that the received data is unsafe for the cloud computing environment 100, the result of the determination may not be transmitted to the trusted portion. In this manner, the trust boundary 106 protects the trusted portion from potentially unsafe and malicious data.

In some implementations, the trust boundary 106 is computer-implemented by separating the processes implemented by the first computer system 102 of the trusted portion and the second computer system 104 of the untrusted portion. Such separation can protect the first computer system 102 in the trusted portion at the operating system level. Alternatively or in addition, the trust boundary 106 can be computer-implemented based on users and file-system permissions such that the untrusted portion cannot read any data from the file system of the trusted portion, while the trusted portion can read the processing results only after the untrusted portion has evaluated the data. In some implementations, the trust boundary 106 can be computer-implemented based on permissions to store data. For example, the first computer system 102 of the trusted portion can have permission to store data in the computer-readable storage media of the cloud computing environment 100. The second computer system 104 of the untrusted portion, on the other hand, does not have permission to store data in the computer-readable storage media of the cloud computing environment 100. Instead, the second computer system 104 of the untrusted portion can be connected to one or more computer-readable storage media that are not associated with the cloud computing environment 100. In these storage media, the second computer system 104 can store data, as described below.

In some implementations, the trust boundary 106 can be implemented as Secured Representational State Transfer (ReST) Application Programming Interfaces (APIs). In such implementations, the processes can communicate, e.g., across the trust boundary 106, via a secure communication protocol such as Hypertext Transfer Protocol Secure (HTTPS) protocol or other secure communication protocol that can decrease or eliminate a likelihood of man-in-the-middle attacks. Instead, the secure communication protocol can allow transfer of metadata alone (e.g., Uniform Resource Locators) for the processed data. Such communication protocol can, alternatively or in addition, implement controlled channels for access to additional data for processing. In such implementations, all requests can be made using HTTPS to guarantee secure transport. Additionally, the second computer system 104 can be bound to listen for incoming requests on the local host only. The trust boundary 106 can further be implemented using a controlled processing environment in which the second computer system 104 of the untrusted portion can be restarted to ensure a clean processing environment. In some implementations, the trust boundary 106 can be implemented with the help of virtualization technologies like Virtual Machines, containers or cgroup permissions as alternatives to or in addition to other trust boundary implementations described here.

In some implementations, a user 108 can provide an input to the cloud computing environment 100 using, e.g., a client device that is connected to the client computing environment 100 over one or more networks, e.g., the Internet. A processor of the first computer system 102 of the trusted portion can receive the input which can include data to be stored and/or executed by the cloud computing environment 100. The first computer system 102 can transmit the data included in the input to a processor of the second computer system 104 of the untrusted portion. As described above, the first computer system 102 has permissions to store data in the cloud computing environment 100 while the second computer system 104 lacks permission to store data in the cloud computing environment 100. The processor of the second computer system 104 can determine that the received data is safe for storage in the cloud computing environment 100. The processor of the second computer system 104 can store the received data at a computer-readable storage medium that is connected to the second computer system 104. The computer-readable storage medium in which the second computer system 104 stores the received data may not be included in, e.g., may be disconnected from, the cloud computing environment 100. To the processor of the first computer system 102, the processor of the second computer system 104 can provide a notification indicating that the received data is safe for storage in the cloud computing environment, and an identifier that points to the stored data at the computer-readable storage medium.

Figure 2:
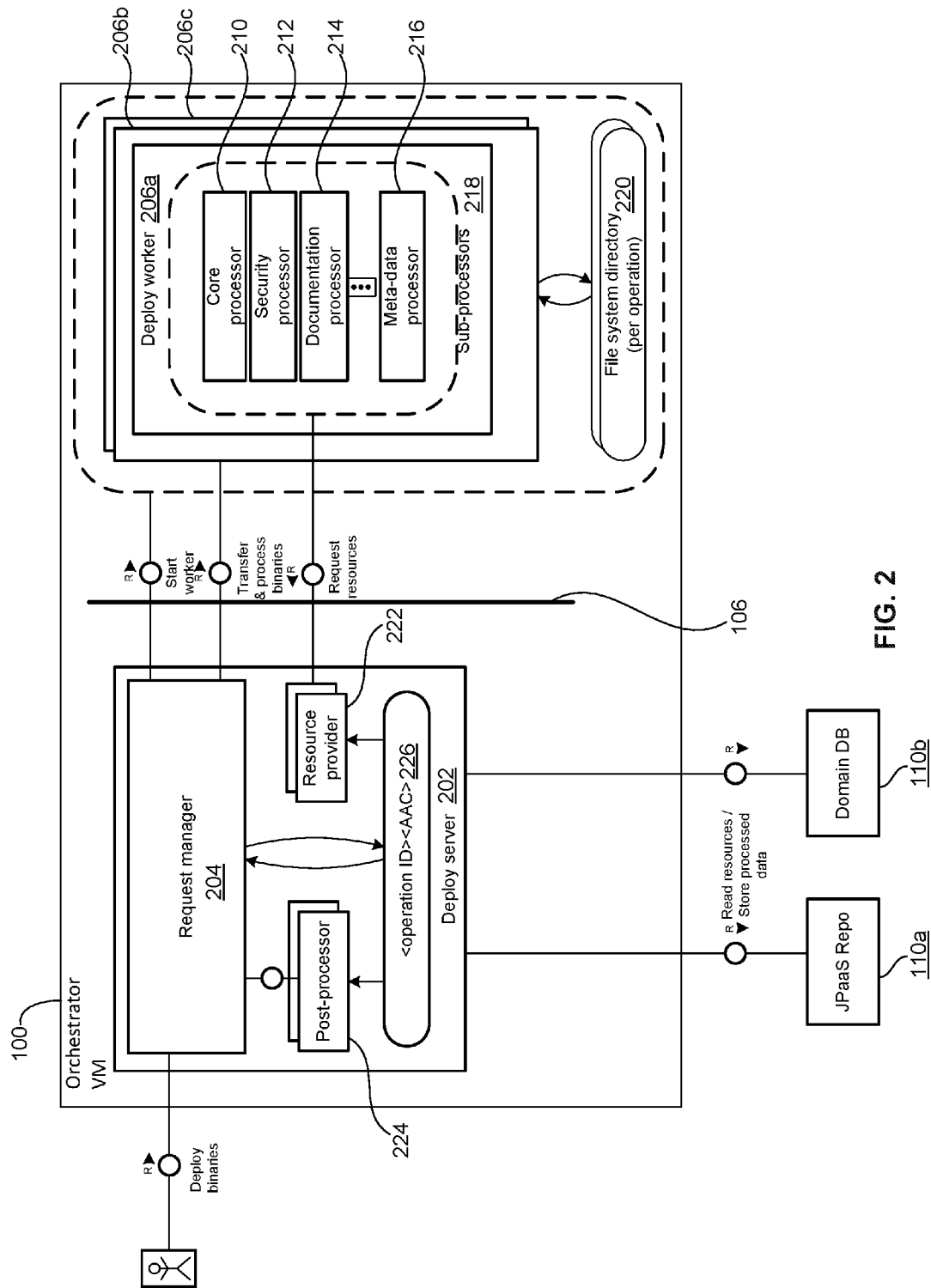
FIG. 2 is a schematic diagram showing features of the trusted portion and the untrusted portion of the cloud computer environment.

FIG. 2 is a schematic diagram showing features of the trusted portion and the untrusted portion of the cloud computer environment 100. As described below with reference to FIG. 2, the cloud computing environment 100 can be divided into a deploy server 202, which can represent the trusted portion of the cloud computing environment 100, and one or more deploy workers (e.g., a first deploy worker 206a, a second deploy worker 206b, a third deploy worker 206c, and fewer or more deploy workers), each of which can represent the untrusted portion of the cloud computing environment 100. The deploy server 202, each deploy worker, and various features of the deploy server and each deploy worker shown in FIG. 2 and described below can be implemented as computer instructions stored on computer-readable media and executable by data processing apparatus (e.g., one or more processors).

The deploy workers can service input data, e.g., application binaries, to perform operations including validate and publish p2 repository (in case bundle or update site is deployed), validate WAB (WAR with bundle manifest), parse and store security roles in domain databases (including plain WAR file), or other operations. Validation of p2 repositories and WABs can include validating imports resolving, validating missing service usage, and validating beta service usage in productive accounts. The trust boundary 106 separates the deploy workers from the deploy server 202, which is the virtual machine which contains confidential data (e.g., BigIP access key, GMP passwords, root certificate, or other confidential data). In this manner, the trust boundary 106 can protect the deploy server 202 from being hacked by processing malicious binaries or storing binaries in improper places (outside of its own storage or inside other application's storage in repositories such as the first computer-readable storage medium 110a or the second computer-readable storage medium 110b).

In some implementations, the deploy server 202 can include a request manager 204 which can receive a request to store data, e.g., application binaries, in the cloud computing environment 100 from the user 108. The request manager 204 can perform some preprocessing on the received data. For example, the request manager 204 can receive the data, unpack the received data, identify file types (e.g., XML or JSON file types), and perform other preprocessing on the received data. In another example, the request manager 204 can detect language and the application server needed to execute the data. In a further example, the request manager 204 can validate and modify metadata to inject proper connection data for working with databases, file servers, printers, industrial controllers, and other machines. In another example, the request manager 204 can extract all metadata associated with the data (such as Java annotations, connection details, and other metadata) and store the metadata for further processing/reference. The preprocessing operations can also include generating an identifier (e.g., globally unique identifier such as operation ID 226), which can include an account application component (AAC) triplet. The preprocessing operations performed by the request manager 204 need not include validating the received data, i.e., evaluating whether the received data is safe for the cloud computing environment 100.

The request manager 204 can then start a deploy worker, e.g., the deploy worker 206a, and provide the received data to the deploy worker 206a. The request manager 204 need not extract or process anything more than the request parameters at this stage to prevent DoS or DDoS attacks. In some implementations, the request manager 204 can provide data received in different inputs to multiple deploy workers (e.g., deploy worker 206b, deploy worker 206c, or other deploy workers). Each request to a deploy worker can be synchronous and, as described below, the results can be returned to the deploy server 202 when the deploy workers have finished processing. In some implementations, the synchronous transfer can have a session timeout (e.g., 30 minutes or a different time) that can ensure that a deploy operation would not last too long and block connection threads between the request manager 204 and the deploy worker.

In some implementations, asynchronous operations can be implemented, e.g., when the connection between the request manager 204 and the deploy workers is distributed over multiple machines and/or nodes such as load balancers, proxies, firewalls, and the like. In such implementations, the request manager 204 may be unable to control timeouts and the asynchronous operations can provide stable long-standing connections.

The deploy worker 206a can be started by a user that has limited permissions, which include reading/writing only in one specified folder which can be used for exchange of data to process, limited access to storage space, or other limited permissions. In some implementations, the deploy worker 206a can be started with a user that is not in the group of authorized users of the computer systems of the trusted portion of the cloud computing environment 100. Such an arrangement will allow removing all permissions for "other" and secure the files inside the computer system of the trusted portion from both list and read. To protect the system files, chroot-ed environment that allows only Java and additionally for maximum security AppArmour can be enabled to protect the Java process from unfamiliar operations. The deploy worker 206a may not be able to use remote communication. This restriction can be enforced using new IPtable rules restricting the communication to local host only. In addition, access to the computer system of the trusted portion can be secured using telnet/console and JMX on local host. In some implementations, a virtualization or container-based approach may be implemented to further isolate the deploy worker 206a. Doing so can prevent excessive usage of computing resources.

The deploy worker 206a can implement processes to do the extraction, parsing, and validation of the application binaries. In some implementations, the deploy worker 206a can process, in parallel, several deploy requests coming from the request manager 204 to minimize the number of deploy worker processes and/or to guarantee isolation between accounts with respect to application binaries. Also, one or more deploy workers may need to be restarted regularly in case a deploy worker has been tempered by a bad code in the process to binaries. The restart can happen when there are no deploy requests for an account for a certain period of time. Deploy time can be improved by maintaining a pool of idle deploy workers that are started when there is a deploy request.

The deploy worker 206a can include a core processor 210 for downloading the binaries and extracting them for basic validation. The core processor 210 can store the downloaded binaries in a processing directory of a computer readable storage medium connected to the deploy worker 206a. The file system directory 220 can maintain the processing directory that cannot be accessed by other deploy workers but can be read by the deploy server 202 whose request manager 204 started the deploy worker 206a. The file system directory 220 isolates the binaries between different deploy worker operations. The core processor 210 can evaluate the received binaries to determine whether the binaries are safe for the cloud computing environment 100. For example, the core processor 210 can evaluate whether the binaries include a ZIP bomb. To do so, the core processor 210 can include some input stream binaries that implement counters. When the reader reaches a byte limit (e.g., 1 GB), when the core processor 210 can determine that the size of the binaries is too big and cease further extraction. In another example, the core processor 210 can search for path traversals in the received binaries. One of the modules implemented by the core processor 210 can extract binaries in the file system directory. During extraction, the module evaluates whether an entry in the ZIP file is a reverted path or an absolute path. If the module identifies a reverted path, then the module ceases extraction. The core processor 210 can, alternatively or in addition, implement other processes to evaluate whether binaries are malicious.

If the core processor 210 determines that the received binaries are malicious, then the received binaries are not processed further. Instead, the deploy worker 206a returns a notification to the deploy server 202 indicating that the received binaries were malicious. If the core processor 210 does not determine that the received binaries are malicious, then the binaries are forwarded to multiple sub-processors 218 for further processing. In some implementations, if the deploy server 202 does not receive a response within a defined timeout, e.g., a threshold time, then the deploy server 202 may mark the binaries as malicious, stop the deploy worker, clean the deploy worker's file system, and restart the deploy worker.

The deploy worker 206a can implement the multiple sub-processors 218 to process the data, i.e., the binaries, and to process the metadata associated with the binaries. The deploy worker 206a can execute the remaining sub-processors 218 over the binaries to determine whether the binaries include any related data. For example, the deploy worker 206a can implement a security processor 212 that can look for security permissions and roles defined in the binaries. If the security processor 212 finds security rows, then the security processor 212 can parse and extract the security permissions and roles and prepare the results of the parsing and extracting to be returned by the core processor 210 to the request manager 204. In another example, the deploy worker 206a can implement a documentation processor 214 and that can search for documentation in the binaries and prepared the results of the search to be returned by the core processor 210 to the request manager 204. In a further example, the deploy worker 206a can implement a metadata processor 216 and/or other processors. The processors included in the sub-processors 218 can extract data from the binaries and return the extracted data to the request manager 204 without storing the extracted data anywhere permanently because the processors do not have the rights to do so.

The deploy server 202 can include a resource provider 222 that executes when the sub-processors 208 are processing the binaries. In some instances, one or more of the sub-processors 208 may need additional data, e.g., from a domain outside the deploy worker 206a or outside the cloud computing environment 100, to process the binaries. For example, one (or more) of the sub-processors 208 can pass a provider ID to the resource provider 222 as part of the request and include accessor's parameters as part of the query parameters. Depending on the definition of protocol between the processor and resource provider, the result type can be either a binary stream of the requested resources (e.g., runtime ZIP file) or JSON body containing some metadata of the requested resource (e.g., data extracted from the domain database).

For example, the security processor 212 may want to see the current roles stored permanently for the binaries while processing new roles so that the security processor 212 can make unions between old and new roles. The security processor 212 can provide a request for the current security roles to the resource provider 222 to obtain the current security roles from the database of the domain from which the binaries were received. The resource provider 222 can validate the request to determine, e.g., whether the request is appropriate and within the scope of the security processor's processes. Once validated, the resource provider 222 will transmit the request to the database of the domain, receive the requested information, and provide the information to the security processor 212. Once the deploy worker 206a completes the processing, as described below, the resource provider 222 does not take any further action and ceases to execute until called upon by another deploy worker.

In some instances, the core processor 210 may not determine that malicious binaries are in fact malicious. In such instances, the malicious data may have slipped past the core processor 210 to the sub-processors 208. However, when the sub-processors 208 perform operations on the binaries, as described above, then the sub-processors 208 may run out of resources when trying to process the malicious binaries. In such instances, either one or more of the sub-processors 208 will fail (e.g., cease to operate) or the operation of one or more of the sub-processors 208 will be significantly slowed. The deploy server 202 can detect such failure or slowing, and determine that the deploy worker 206a has been processing malicious data. The deploy server 202 can identify the binaries that caused the failure or slowing based on the identifier that the request manager 204 assigned generated for the binaries, and ignore and/or reject the binaries. The deploy server 202 can then restart the deploy worker 206a to validate another binaries input. A container or other virtualization technology can, alternatively or in addition, be used to prevent excessive use of resources and to detect such cases.

The deploy worker 206a also uses the file system directory 220 to transfer data between the deploy worker 206a and the deploy server 202. The file system directory 220 stores the information that is parsed and extracted from the various sub-processors 218. The file system directory 220 associates the stored information with the identifier (e.g., the operation ID 226) that the request manager 204 generated for the received data. In some implementations, the deploy worker 206a can provide the identifier that points to the stored data to the deploy server 202. In this manner, the deploy worker 206a provides the binaries and the security information, documentation, metadata (or combinations of them) that are extracted by the sub-processors 218 to the deploy server 202. The binaries and the extracted information are provided only after the core processor 210 determines that the binaries are safe for the cloud computing environment 100 and if the sub-processors do not fail or significantly slow down when parsing and extracting the binaries.

The deploy server 202 implements multiple post processors 224. In some implementations, the deploy server 202 can include a post processor for each sub-processor 208. For example, the post processors 224 can include a security post-processor, a documentation post-processor, a metadata post-processor, to name a few. The request manager 204 receives the information from the deploy worker 206a. The request manager 204 passes the received information to the post processors 224. For example, the security post-processor, the documentation post-processor and the metadata post-processor can receive the information parsed and extracted by the security processor 210, the documentation processor 214 and the metadata processor 216, respectively. In some implementations, the request manager 204 receives and passes to the post processors 224, the identifier (or identifiers) that the deploy worker 206a generated to identify the directories in the file system directory 220 in which the received binaries and the data parsed and extracted from the binaries were stored. For example, the deploy worker 206a can pass the identifiers as Uniform Resource Identifiers (URIs) to the request manager. The post processors 224 can receive the URIs from the request manager 204, and retrieve the data by accessing the URIs.

The deploy server 202 executes the post processors 224 in the trusted portion of the cloud computing environment 100. The post processors 224 can protect against harmful instructions coming from the deploy worker 206a by checking for processor ID, e.g., whether the processor ID is known, and for data, e.g., whether the data can be stored for the AAC triplet of the deploy operation. In some implementations, the deploy server 202 can include an internal post processor that may store data, not for the AAC of the deploy operation, but in another AAC triplet storage. In such implementations, because the internal post processor may intentionally violate the trust boundary 106, the deploy server 202 can implement additional checks. For example, the deploy server 202 can validate the data that the post processors 224 are about to store, e.g., using input validation, proper format checks, and using other validation techniques. The deploy server 202 can expose a white-list for the operations violating the trust boundary 106.

The post processors 224 have the right to permanently store data in computer-readable storage media of the cloud computing environment 100. For example, the post processors 224 can store the data in domain or system databases, e.g., a JPaaS repository 110a or a domain database 110b until the binaries are undeployed. The JPaaS repository 110a can store binaries and files provided by the user. The domain database 1110b can store metadata like security roles, application configurations, and the like. The binaries can be undeployed, e.g., in response to user input or upon termination of processes performed by executing the binaries.

Figure 3:
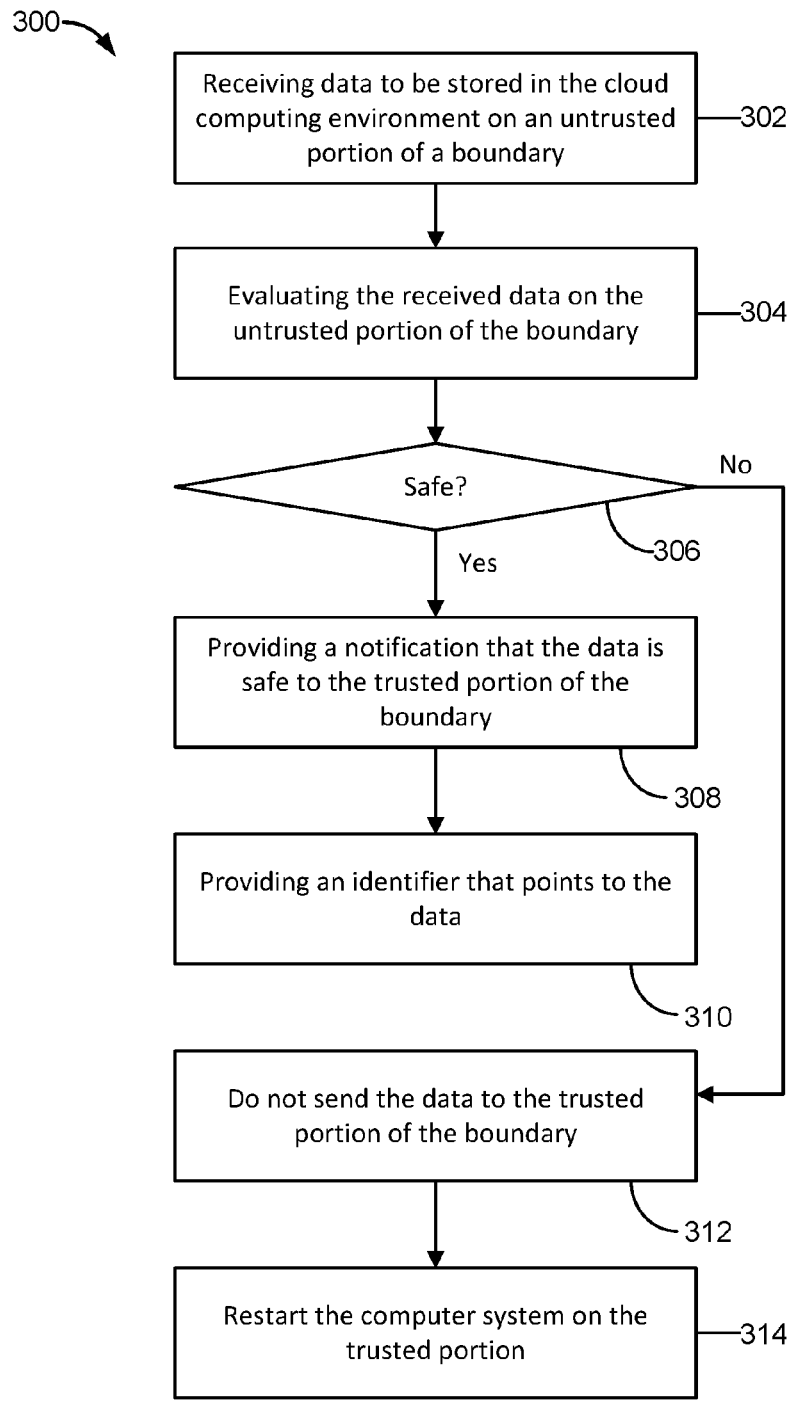
FIG. 3 is a flowchart of an example process for securing the cloud computing environment from data received from a user.

FIG. 3 is a flowchart of an example process 300 for securing the cloud computing environment from data received from a user. Some portions of the process 300 can be implemented by one or more computer systems of the trusted portion of the cloud computing environment 100 while others can be implemented by one or more computer systems of the untrusted portion. At 302, data to be stored in the cloud computing environment 100 is received by the computer system of the trusted portion. The computer system of the untrusted portion receives the data from the user and transmits the data to the computer system of the trusted portion.

At 304, the received data is evaluated by the computer system of the untrusted portion. At 306, a check is performed to determine whether the received data is safe for storage in the cloud computing environment. If the received data is determined to be safe, then, at 308, a notification that the data is safe is provided to the computer system of the trusted portion. At 310, an identifier that points to the data is sent to the computer system of the trusted portion. If the received data is determined to not be safe, then, at 312, the data is not sent to the computer system of the trusted portion. At 314, the computer system of the untrusted portion is restarted to remove the effects of processing the unsafe data.

Figure 4B:
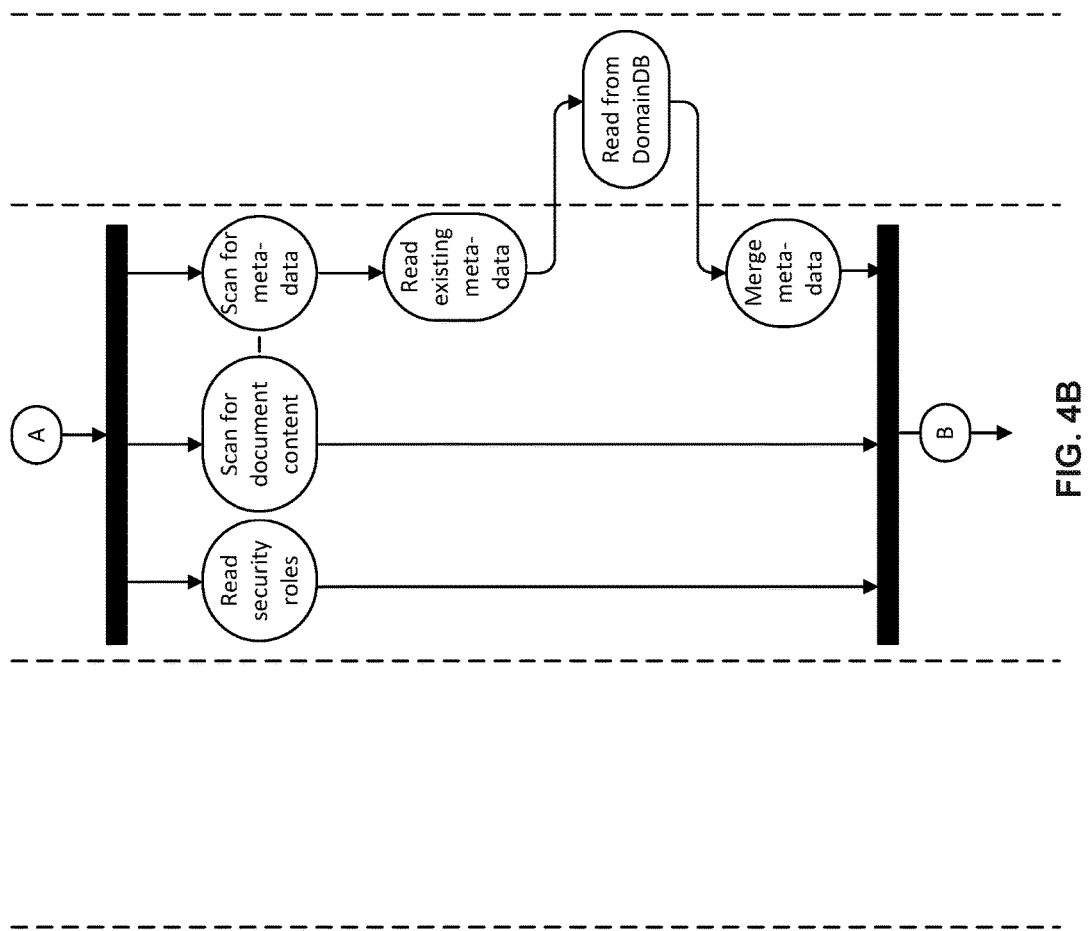
Figure 4C:
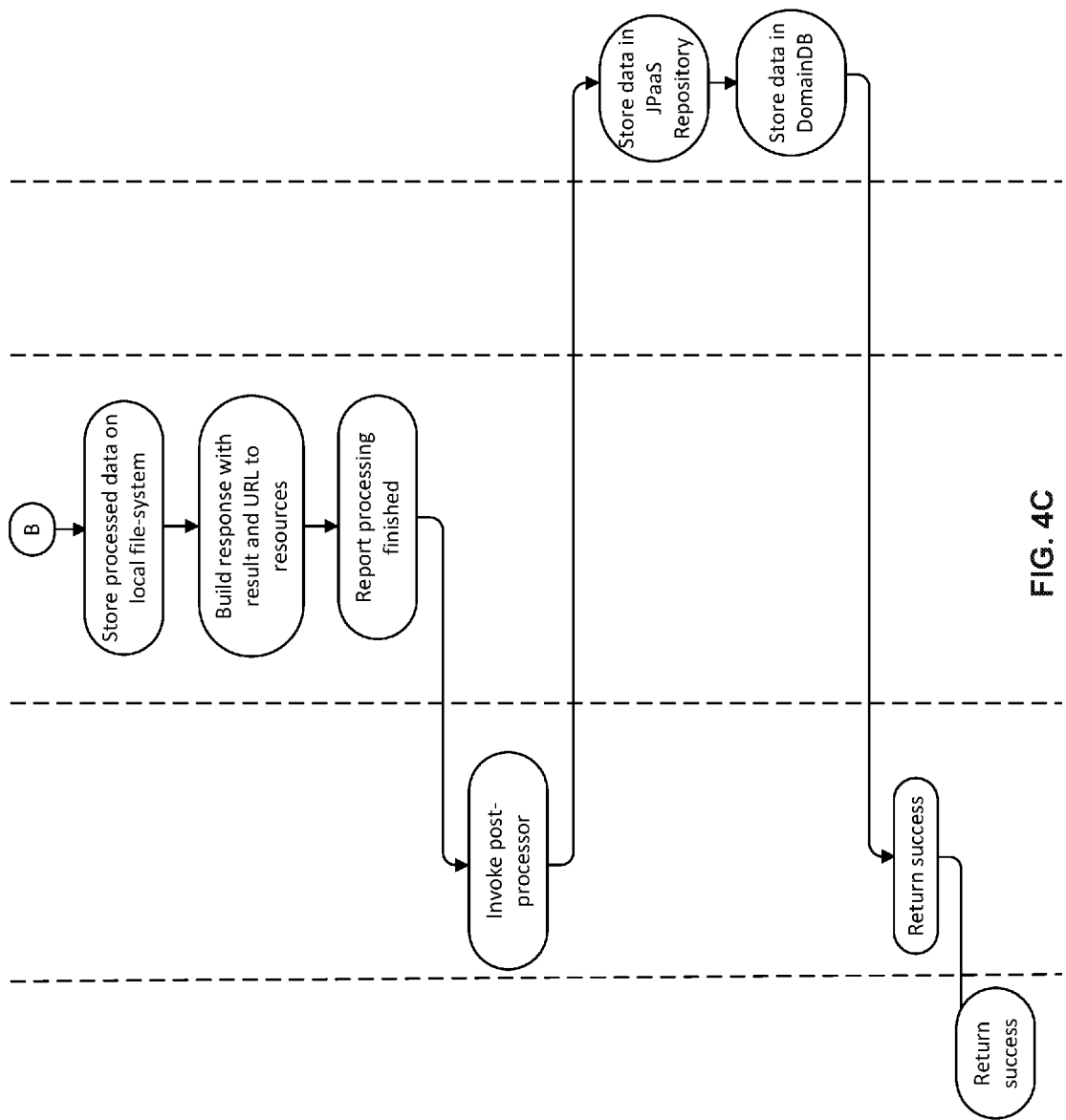

FIGS. 4A and 4B are showing a line diagram showing example operations performed by different entities in the cloud computing environment. A deploy client 108 uploads binaries to be stored and/or executed by the cloud computing environment 100. The request manager 204 receives the request and, from the request, extracts account, application and component information. The request manager 204 may determine that a deploy worker is currently not running, and start the deploy worker. The request manager 204 transfers the received binaries to the deploy worker. In some implementations, the request manager 204 can mimic the Deploy API and handle incoming deploy requests.

The deploy worker (e.g., the deploy worker 206a) starts processing the received binaries. The deploy worker 206a can mimic the Deploy API as well, to easily move the logic in a library and reuse the code, and to implement a new ResT API. To start processing, the deploy worker 206a lists and runs the processors, which can include a security subprocessor which reads security roles, a documentation processor, which scans the documents for content, and a metadata sub-processor which scans the binaries for metadata. The metadata sub-processor can read existing metadata. In some instances, the metadata sub-processor may request the resource provider 222 to obtain some resources. The resource provider 222 can validate the request, and, if validated, obtain the requested resources by reading the domain database. The resource provider 222 can provide the requested resources to the metadata sub-processor which can merge the metadata with the received resources. The deploy worker 206a can store the processed data on a local file system and build a response to the transmission from the request manager 204 with results of the processing and URIs pointing to the stored resources. The results can include codes of the existing ResT API and include a body with the processing results including URI to the binaries and security roles. The deploy worker 206a can then report to the request manager 204 that the processing has finished.

The request manager 204 can then invoke the post-processors 224, which can retrieve the data from the local file system of the deploy worker 206a using the received URIs. The post-processors 224 can store data in the JPaaS repository 110a and data in the domain database 110b. The post-processors 224 can transmit a success notification to the request manager 204, which, in turn, can transmit a success notification to the deploy client 108. An example of a success notification received by the request manager can be implemented as a JSON body shown below:

```
[
    {
        "processorID" : "...", // Processor ID - used to specify the id if
    the post-processor which shall process this part of the response
        "data" : {
            // processor ID specific content, this is to be defined
    between the processor and post-processor
        }
    },
    {
        "processorID" : "...", // Processor ID - used to specify the id if
    the post-processor which shall process this part of the response
        "data" : {
            // processor ID specific content, this is to be defined
    between the processor and post-processor
        }
    }
]
```

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, by a first computer system lacking permissions to store data in a cloud computing environment implemented by a second computing system, data, wherein the data is transmitted from a second computer system implementing the cloud computing environment, and wherein the second computer system possesses permissions to store data in the cloud computing environment; and
   providing, by the first computer system:
      a notification to the second computer system indicating that the received data is safe for storage in the cloud computing environment, and
      an identifier that points to the received data stored at a computer-readable storage medium accessible to the first computer system.

2. The computer-implemented method of claim 1, comprising determining, by the first computer system, that the received data is safe for storage in the cloud computing environment.

3. The computer-implemented method of claim 1, comprising generating, by the first computer system, the identifier that points to the stored data at the computer-readable storage medium.

4. The computer-implemented method of claim 1, comprising temporarily storing, by the first computer system, at least one of security information, documentation, or metadata in the computer-readable storage medium extracted by the first computer system processing the received data, wherein the second computer system permanently stores the extracted at least one of the security information, the documentation, or the metadata.

5. The computer-implemented method of claim 4, wherein processing the received data to extract the at least one of security information, documentation, or metadata included in the received data comprises:
   determining that an additional resource is required to extract the at least one of security information, documentation, or metadata; and
   transmitting a request for the additional resource to the second computer system.

6. The computer-implemented method of claim 5, comprising:
   receiving, by the second computer system, the request for the additional resource; and
   in response to receiving the request for the additional resource:
      retrieving, by the second computer system, the additional resource, and
      providing, by the second computer system, the additional resource to the first computer system.

7. The computer-implemented method of claim 1, comprising:
   receiving, by the second computer system, a request to store the data in the cloud computing environment;
   generating an identifier to identify the data; and
   providing, by the second computer system, the data to be stored in the cloud computing environment to the first computer system.

8. The computer-implemented method of claim 1, comprising, in response to receiving the notification and the identifier:
   retrieving, by the second computer system, the stored data from the computer-readable storage medium identified by the identifier; and storing the retrieved data at one or more computer-readable storage media connected to the cloud computing environment.

9. The computer-implemented method of claim 1, wherein the data received from the second computer system is first data, and wherein the notification is a first notification.

10. The computer-implemented method of claim 1, comprising:
receiving, by the first computer system, second data received from the second computer system, wherein the second data is unsafe for storing or execution in the cloud computing environment; and
failing, by the first computer system, to process the second data.

11. The computer-implemented method of claim 10, comprising:
determining, by the second computer system, that the first computer system has failed to process the second data; and
identifying, by the second computer system, the second data as being unsafe for storing or execution in the cloud computing environment.

12. A non-transitory computer-readable medium storing one or more instructions executable by one or more processors to:
receive, by a first computer system lacking permissions to store data in a cloud computing environment implemented by a second computing system, data, wherein the data is transmitted from a second computer system implementing the cloud computing environment, and wherein the second computer system possesses permissions to store data in the cloud computing environment; and
provide, by the first computer system:
a notification to the second computer system indicating that the received data is safe for storage in the cloud computing environment, and
an identifier that points to the received data stored at a computer-readable storage medium accessible to the first computer system.

13. The non-transitory computer-readable medium of claim 12, comprising one or more instructions for the first computer system to determine that the received data is safe for storage in the cloud computing environment.

14. The non-transitory computer-readable medium of claim 12, comprising one or more instructions for the first computer system to temporarily store at least one of security information, documentation, or metadata in the computer-readable storage medium extracted by processing the received data, wherein the second computer system permanently stores the extracted at least one of the security information, the documentation, or the metadata.

15. The non-transitory computer-readable medium of claim 14, wherein processing the received data to extract the at least one of security information, documentation, or metadata included in the received data comprises one or more instructions to:
determine that an additional resource is required to extract the at least one of security information, documentation, or metadata; and
transmit a request for the additional resource to the second computer system.

16. The non-transitory computer-readable medium of claim 14, comprising one or more instructions to:
receive, by the second computer system, the request for the additional resource; and
in response to receiving the request for the additional resource:
retrieve, by the second computer system, the additional resource, and
provide, by the second computer system, the additional resource to the first computer system.

17. The non-transitory computer-readable medium of claim 12, wherein the data received from the second computer system is first data, wherein the notification is a first notification, and wherein the non-transitory computer-readable medium comprises one or more instructions to:
receive, by the first computer system, second data that is unsafe for storing or execution in the cloud computing environment;
fail, by the first computer system, to process the second data;
determine, by the second computer system, that the first computer system has failed to process the second data; and
identify, by the second computer system, the second data as being unsafe for storing or execution in the cloud computing environment.

18. A computer-implemented system comprising:
a first computer system lacking permissions to store data in a cloud computing environment implemented by a second computing system that possesses permissions to store data in the cloud computing environment, wherein the first computer system is configured to:
receive data transmitted from the second computer system;
determine that the received data is safe for storage in the cloud computing environment; and
provide a notification to the second computer system indicating that the received data is safe for storage in the cloud computing environment and an identifier that points to the received data stored at a computer-readable storage medium accessible to the first computer system.

19. The computer-implemented system of claim 18, further configured to:
receive, by the second computer system, the request for the additional resource; and
in response to receiving the request for the additional resource:
retrieve, by the second computer system, the additional resource, and
provide, by the second computer system, the additional resource to the first computer system.

20. The computer-implemented system of claim 18, wherein the data received from the second computer system is first data, wherein the notification is a first notification, and wherein the computer-implemented system is further configured to:
receive, by the first computer system, second data that is unsafe for storing or execution in the cloud computing environment;
fail, by the first computer system, to process the second data;
determine, by the second computer system, that the first computer system has failed to process the second data; and
identify, by the second computer system, the second data as being unsafe for storing or execution in the cloud computing environment.

* * * * *